US012759407B2

(12) United States Patent
Takemura et al.

(10) Patent No.: US 12,759,407 B2
(45) Date of Patent: Oct. 13, 2026

(54) CONTROL DEVICE

(71) Applicant: DENSO CORPORATION, Kariya-city (JP)

(72) Inventors: Yuichi Takemura, Kariya-city (JP); Keita Fujii, Kariya-city (JP); Masato Fukushi, Kariya-city (JP); Shinsuke Kawazu, Kariya-city (JP)

(73) Assignee: DENSO CORPORATION, Kariya (JP)

( * ) Notice: Subject to any disclaimer, the term of this patent is extended or adjusted under 35 U.S.C. 154(b) by 103 days.

(21) Appl. No.: 18/776,912

(22) Filed: Jul. 18, 2024

(65) Prior Publication Data

US 2024/0367808 A1 Nov. 7, 2024

Related U.S. Application Data

(63) Continuation of application No. PCT/JP2022/047165, filed on Dec. 21, 2022.

(30) Foreign Application Priority Data

Jan. 19, 2022 (JP) ................................ 2022-006053

(51) Int. Cl.
*B60L 3/04* (2006.01)
*B64D 27/30* (2024.01)
(Continued)

(52) U.S. Cl.
CPC ................ *B60L 3/04* (2013.01); *B64D 27/30* (2024.01); *B64D 27/34* (2024.01); *B64D 31/06* (2013.01); *B64D 31/16* (2024.01); *B60L 2200/10* (2013.01)

(58) Field of Classification Search
CPC ....... B60L 3/04; B60L 2200/10; B64D 27/30; B64D 27/34; B64D 31/06; B64D 31/16; B64C 29/0025; Y02T 50/60
(Continued)

(56) References Cited

U.S. PATENT DOCUMENTS

| | | | |
|---|---|---|---|
| 10,023,318 B2 | 7/2018 | Kobayashi et al. | |
| 2005/0104552 A1* | 5/2005 | Arai | H02P 25/024 318/801 |

(Continued)

FOREIGN PATENT DOCUMENTS

| | | |
|---|---|---|
| CN | 101752948 A | 6/2010 |
| JP | 2003-182694 A | 7/2003 |
| JP | 2021-118573 A | 8/2021 |

*Primary Examiner* — Muhammad Shafi
(74) *Attorney, Agent, or Firm* — Oliff PLC

(57) ABSTRACT

In a control device including a control unit that controls an EPU for powering a rotor included in an electric aircraft, the EPU includes a motor, an inverter, a control circuit, and a first sensor that detects an operation-related value. If there is no a sudden change in the operation-related value detected by the first sensor, the control unit controls the EPU based on the operation-related value detected by the first sensor. When the sudden change occurs, the control unit stops using the operation-related value detected by the first sensor to control the EPU. After the occurrence of the sudden change, when the sudden change ends before a predetermined period elapses, the control unit resumes using the operation-related value detected by the first sensor to control the EPU, and when the sudden change has not ended, the control unit continues the stoppage.

15 Claims, 11 Drawing Sheets

(51) Int. Cl.
*B64D 27/34* (2024.01)
*B64D 31/06* (2006.01)
*B64D 31/16* (2024.01)

(58) Field of Classification Search
USPC .............................................................. 701/3
See application file for complete search history.

(56) References Cited

U.S. PATENT DOCUMENTS

| | | | | |
|---|---|---|---|---|
| 2020/0102089 | A1* | 4/2020 | Yamamoto | B64D 45/0005 |
| 2022/0006418 | A1* | 1/2022 | Sato | B64C 13/00 |
| 2022/0177123 | A1 | 6/2022 | Hashimoto et al. | |
| 2023/0049397 | A1 | 2/2023 | Kawadu | |
| 2024/0359820 | A1 | 10/2024 | Kawadu | |

* cited by examiner

FIFTH EMBODIMENT

CONTROL DEVICE

CROSS-REFERENCE TO RELATED APPLICATION

The present application is a continuation application of International Application No. PCT/JP2022/047165, filed on Dec. 21, 2022, which claims priority to Japanese Patent Application No. 2022-006053, filed on Jan. 19, 2022. The contents of these applications are incorporated herein by reference in their entirety.

BACKGROUND

Technical Field

The present disclosure relates to a control device that controls an electric propulsion unit for powering a rotor included in an electric aircraft.

Background Art

In recent years, electric aircraft having rotors called electric vertical takeoff and landing aircraft (eVTOL) have been developed. Such an electric aircraft may use an electric propulsion unit (EPU) including a motor that rotates a rotor, and also an inverter, a control circuit, and a sensor. For conventional aircraft having rotors (e.g., a helicopter), for example, various actions have been proposed to deal with sudden events such as gusts of wind.

SUMMARY

In the present disclosure, provided is a control device as the following.

The control device includes a control unit configured to control an electric propulsion unit for powering a rotor included in an electric aircraft. The electric propulsion unit includes a motor, an inverter, a control circuit, and a first sensor configured to detect an operation-related value. The control unit is configured to: if there is no a sudden change that is a change in the operation-related value detected by the first sensor beyond a predetermined range within a predetermined time, control the electric propulsion unit based on the operation-related value detected by the first sensor; when the sudden change occurs, stop using the operation-related value detected by the first sensor to control the electric propulsion unit; after the occurrence of the sudden change, when the sudden change ends before a predetermined period elapses, resume using the operation-related value detected by the first sensor to control the electric propulsion unit; and after the occurrence of the sudden change, when the sudden change has not ended after the predetermined period elapses, continue the stoppage.

BRIEF DESCRIPTION OF THE DRAWINGS

The above and other objectives, features, and advantages of the present disclosure will become more clearly apparent from the detailed description given below with reference to the accompanying drawings, in which.

DETAILED DESCRIPTION OF THE PREFERRED EMBODIMENTS

[PTL 1] JP 2003-182694 A

Figure 1:
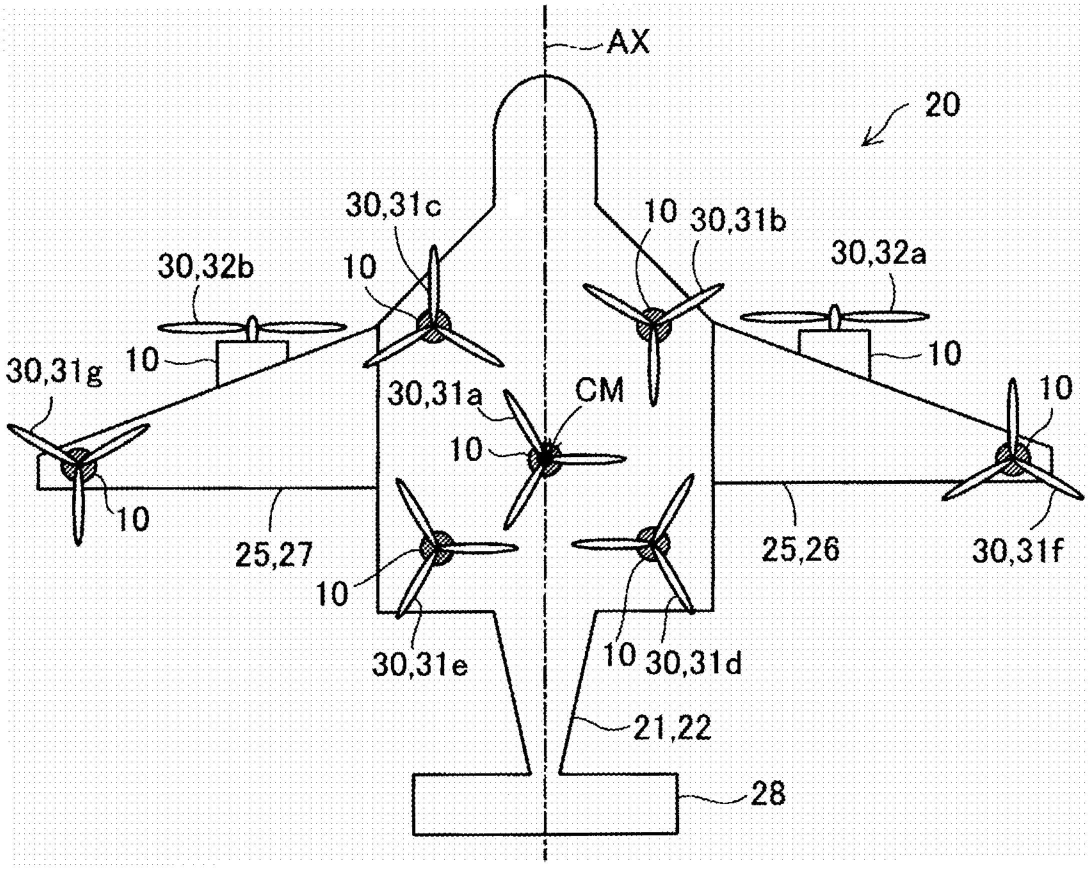
FIG. 1 is a schematic top view of an electric aircraft including a control device according to an embodiment of the present disclosure.

Electric aircraft having rotors, such as eVTOLs, have many differences from conventional aircraft having rotors, such as lower output from a power output device, sensor detection values that may vary more greatly in the event of gusts of wind, a lightning strike, or a bird strike, and more sensors for flight control. However, for electric aircraft having rotors, actions to be taken to deal with an event such as a great change in sensor detection values have not yet been sufficiently studied. Thus, there is a desire for a technique that can take appropriate actions for electric aircraft having rotors in response to an event such as a great change in sensor detection values.

An aspect of the present disclosure provides a control device including a control unit configured to control an electric propulsion unit for powering a rotor included in an electric aircraft. The electric propulsion unit includes a motor configured to rotate the rotor, an inverter configured to supply AC power to the motor, a control circuit configured to control the inverter, and a first sensor configured to detect an operation-related value related to an operation state of the electric propulsion unit including an operation of the motor. The control unit is configured to, if there is no a sudden change that is a change in the operation-related value detected by the first sensor beyond a predetermined range within a predetermined time, control the electric propulsion unit based on the operation-related value detected by the first sensor. The control unit is configured to, when the sudden change occurs, stop using the operation-related value detected by the first sensor to control the electric propulsion unit. The control unit is configured to, after the occurrence of the sudden change, when the sudden change ends before a predetermined period elapses, resume using the operation-related value detected by the first sensor to control the electric propulsion unit. The control unit is configured to, after the occurrence of the sudden change, when the sudden change has not ended after the predetermined period elapses, continue the stoppage.

The control device according to this aspect, in the event of a sudden change, stops using the operation-related value detected by the first sensor to control the electric propulsion unit, thus preventing unstable operation of the electric aircraft caused by control over the electric propulsion unit that is based on the suddenly changed operation-related value. After the occurrence of the sudden change, when the sudden change ends before the predetermined period elapses, the control unit resumes using the operation-related value detected by the first sensor to control the electric propulsion unit, thus preventing the control over the electric propulsion unit that is based on the operation-related value detected by the first sensor from being permanently stopped due to temporary fluctuations in the operation-related value. After the occurrence of the sudden change, when the sudden change has not ended at the end of the predetermined period, the control over the electric propulsion unit that is based on the operation-related value detected by the first sensor continues to be stopped, thus more reliably preventing unstable operation of the electric aircraft caused by control over the electric propulsion unit that is based on the suddenly changed operation-related value.

Another aspect of the present disclosure provides a control device including a control unit configured to control an electric propulsion unit for powering a rotor included in an electric aircraft. The electric propulsion unit includes a motor configured to rotate the rotor, an inverter configured to supply AC power to the motor, a control circuit configured to control the inverter, and a first sensor configured to detect an operation-related value related to an operation state of the electric propulsion unit including an operation of the motor. If there is no sudden change that is a change in the operation-related value detected by the first sensor beyond a predetermined range within a predetermined time, the control unit is configured to control the electric propulsion unit based on the operation-related value detected by the first sensor. When a sudden change occurs, the control unit is configured to: stop power supply that depends on a target value to the rotor from an anomalous unit being the electric propulsion unit in which the sudden change has occurred; attempt to drive the anomalous unit with a target value smaller than the target value and determine whether the anomalous unit is normal based on the operation-related value detected by the first sensor; when the anomalous unit is determined to be normal, resume using the operation-related value detected by the first sensor to control the electric propulsion unit; and when the anomalous unit is determined to be not normal, continue the stoppage.

The control device according to this aspect, in the event of a sudden change, stops the power supply that depends on the target value to the rotor from the anomalous unit that is the electric propulsion unit in which the sudden change has occurred, thus preventing unstable operation of the electric aircraft caused by the control over the electric propulsion unit that is based on the operation-related value detected by the first sensor included in the anomalous unit. Furthermore, since the anomalous unit is to be driven with a value smaller than the target value, and the operation-related value detected by the first sensor is used to determine whether the anomalous unit is normal, the determination based on the actual operation of the anomalous unit can improve the determination accuracy. If the anomalous unit is determined to be normal, the control unit resumes using the operation-related value detected by the first sensor to control the electric propulsion unit, thus preventing the control over the electric propulsion unit that is based on the operation-related value detected by the first sensor from being permanently stopped due to temporary fluctuations in the operation-related value. If the anomalous unit is determined to be not normal, the control over the electric propulsion unit that is based on the operation-related value detected by the first sensor continues to be stopped, thus more reliably preventing unstable operation of the electric aircraft caused by control over the electric propulsion unit that is based on the suddenly changed operation-related value.

A. First Embodiment

A1. Device Configuration

An electric aircraft 20 illustrated in FIG. 1 is also referred to as an electric vertical takeoff and landing aircraft (eVTOL) and a manned aircraft that can take off and land vertically and be propelled horizontally. The electric aircraft 20 includes a body 21, nine rotors 30, and nine electric propulsion units (hereinafter, also referred to as EPUs) 10 provided on a one-to-one basis for the rotors.

The body 21 corresponds to the electric aircraft 20 from which the nine rotors 30 and the EPUs 10 are removed. The body 21 includes a main body 22, main wings 25, and a tail assembly 28.

The main body 22 is the fuselage of the electric aircraft 20. The main body 22 is bilaterally symmetrical about an axis AX taken as the axis of symmetry. In the present embodiment, the term "axis AX" refers to an axis extending through the body gravity center CM of the electric aircraft 20 and in the front-and-rear direction of the electric aircraft 20. The term "body gravity center CM" refers to the position of the gravity center of the electric aircraft 20 in an empty weight condition with no occupant inside. The main body 22 has an internal flight compartment (not shown).

The main wings 25 include a right wing 26 and a left wing 27. The right wing 26 extends rightward from the main body 22. The left wing 27 extends leftward from the main body 22. The right wing 26 and the left wing 27 are each equipped with two rotors 30 and two EPUs 10. The tail assembly 28 is provided at the rear end of the main body 22.

Five of the nine rotors 30 are arranged in a central area on the top surface of the main body 22. The five rotors 30 function as hovering rotors 31*a* to 31*e* for mainly producing the lift for the body 21. The hovering rotor 31*a* is placed at the position corresponding to the body gravity center CM. The hovering rotor 31*b* and the hovering rotor 31*c* are arranged in line symmetry with each other with respect to the axis AX in front of the hovering rotor 31*a*. The hovering rotor 31*d* and the hovering rotor 31*e* are arranged in line symmetry with each other with respect to the axis AX behind the hovering rotor 31*a*. Two of the nine rotors 30 are arranged on the right wing 26 and the left wing 27. Specifically, the right wing 26 has a hovering rotor 31*f* placed at the end of its top surface, and the left wing 27 has a hovering rotor 31*g* placed at the end of its top surface.

The other two of the nine rotors 30 are arranged on the right wing 26 and the left wing 27 and function as cruising rotors 32*a* and 32*b* for mainly producing the horizontal thrust for the body 21. The cruising rotor 32*a* placed on the right wing 26 and the cruising rotor 32*b* placed on the left wing 27 are arranged in line symmetry with each other with respect to the axis AX. The rotors 30 are rotated about their own rotational shafts (shafts 17 described later) independently of each other. Each rotor 30 includes three blades arranged at equal angles with respect to each other.

Figure 2:
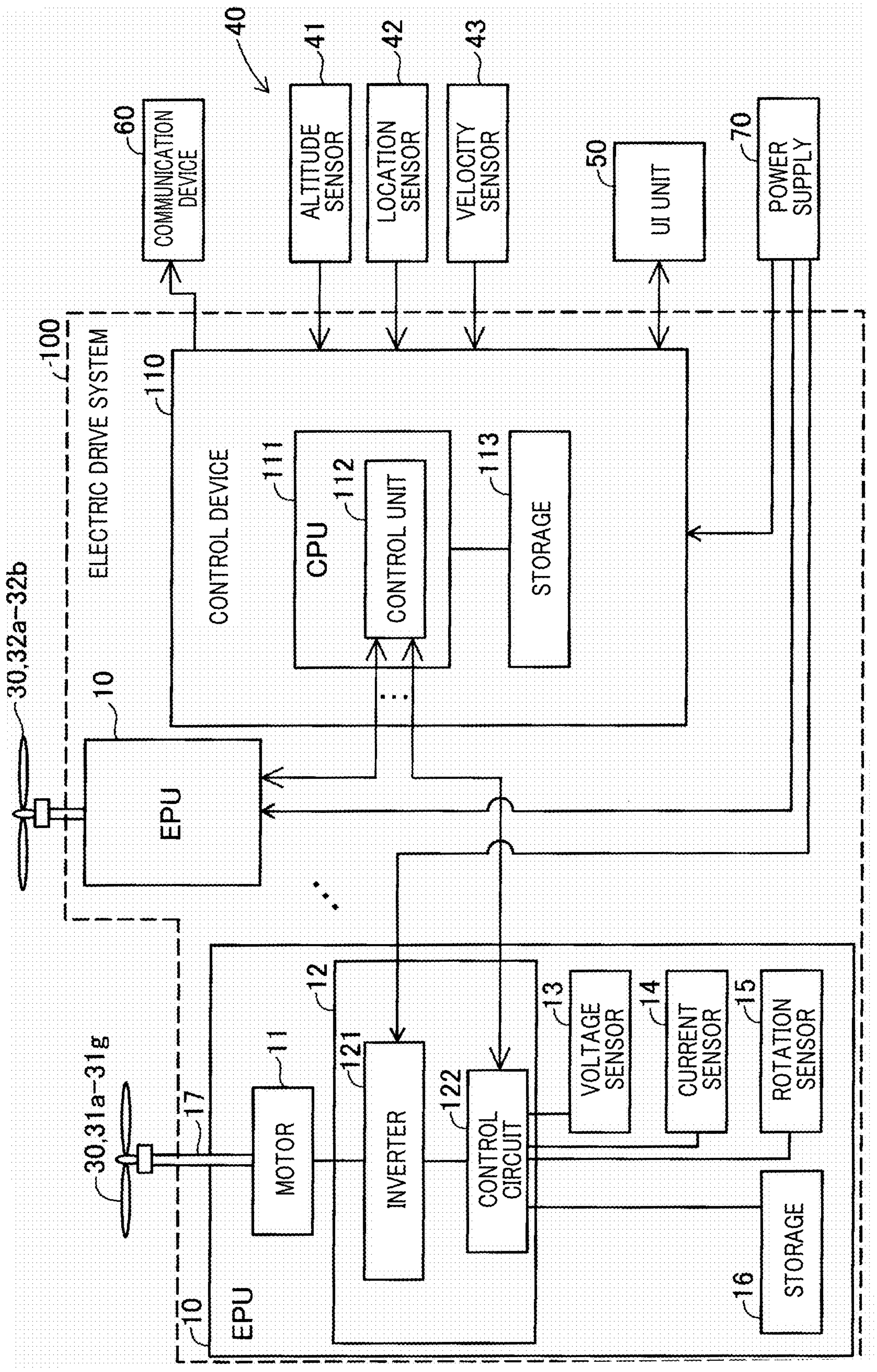
FIG. 2 is a functional block diagram of an electric drive system.

As illustrated in FIG. 2, the nine EPUs 10 corresponding to the individual rotors 30 are included in an electric drive system 100. The electric drive system 100 is a system that controls the EPUs 10 to rotate the rotors 30 in accordance with preset flight programs or the pilot's control or external piloting. The EPUs 10 corresponding to the hovering rotors 31*a* to 31*g* are also referred to as hovering EPUs or hovering propulsion units. The EPUs 10 corresponding to the cruising rotors 30*a* and 30*b* are also referred to as cruising EPUs or cruising propulsion units.

The nine EPUs 10 has substantially the same configuration. Each EPU 10 includes a motor 11, an inverter unit (INV unit) 12, a voltage sensor 13, a current sensor 14, a rotation sensor 15, a storage 16, and a shaft 17. The EPU 10 is a system that causes the rotor 30 to rotate at the rotational torque and rotational speed corresponding to a command from a control device 110 described later.

The motor 11 rotates the rotor 30 via the shaft 17. The motor 11 in the present embodiment is a three-phase AC brushless motor and rotates the shaft 17 based on the voltage and current supplied from an inverter 121 described later. The motor 11 may not be a brushless motor but may be a motor of any type, such as an induction motor or a reluctance motor.

The inverter unit 12 includes the inverter 121 and a control circuit 122. The inverter 121 includes a power element such as an insulated gate bipolar transistor (IGBT) or a metal-oxide-semiconductor field-effect transistor (MOSFET) and supplies the motor 11 with drive power by switching at the duty ratio corresponding to a control signal provided from the control circuit 122.

The control circuit 122 controls the overall EPU 10. Specifically, the control circuit 122 generates a drive signal in response to an instruction from the control device 110 described later and provides the drive signal to the inverter 121. The control circuit 122 also sends detection values from the sensors 13 to 15 to the control device 110. In the present embodiment, the control circuit 122 is a microcomputer including a CPU, a ROM, and a RAM.

The voltage sensor 13 detects the voltage supplied from a power supply 70 described later. The current sensor 14 is provided between the inverter 121 and the motor 11 and detects the driving current (phase current) in each phase of the motor 11. The rotation sensor 15 detects the rotational speed of the motor 11. The detection values from the voltage sensor 13, the current sensor 14, and the rotation sensor 15 are chronologically stored in a storage 16 and output to the control device 110 through the control circuit 122. The storage 16 stores various control programs, various sensor detection values, and also sudden change related information described later. The sudden change related information will be described in detail later.

The electric drive system 100 includes the control device 110 in addition to the nine EPUs 10 described above. The control device 110 controls the overall electric drive system 100 and also controls each EPU 10. In the present embodiment, the control device 110 includes a CPU 111 and a storage 113. The storage 113 stores a control program, and the CPU 111 executes the control program to function as a control unit 112 for controlling the electric drive system 100. The control unit 112 communicates periodically with each EPU 10. The communication transmits a control command from the control unit 112 to each EPU 10. The communication also transmits the detection values of the voltage sensor 13, the current sensor 14, and the rotation sensor 15 (operation-related values described later) and sudden change related information described later from each EPU 10 to the control unit 112. The control unit 112 performs feedback control of each EPU 10 using information received from each EPU 10. Specifically, the control unit 112 determines a new torque command value using information received from each EPU 10, generates a control command including the torque command value, and transmits the control command to each EPU 10 to control the EPU 10. The storage 113 stores the sudden change related information received from each EPU 10.

A sensor set 40 includes an altitude sensor 41, a location sensor 42, and a velocity sensor 43. The altitude sensor 41 detects the current altitude of the electric aircraft 20. The location sensor 42 identifies the current location of the electric aircraft 20 in latitude and longitude. In the present embodiment, the location sensor 42 is a Global Navigation Satellite System (GNSS) sensor. The GNSS may be, for example, the Global Positioning System (GPS). The velocity sensor 43 detects the velocity of the electric aircraft 20.

A UI unit 50 provides a user interface for controlling the electric aircraft 20 and monitoring the operation state to the occupant in the electric aircraft 20. The user interface includes, for example, an operation input unit such as a keyboard or a button and a display such as a liquid crystal display panel. The UI unit 50 is installed in, for example, the cockpit of the electric aircraft 20. The pilot may control the flight of the electric aircraft 20 or check the operation state of each EPU 10 through the UI unit 50.

A communication device 60 communicates with other electric aircraft or a ground control center. The communication device 60 is, for example, a civil VHF radio. The communication device 60 may not be a civil VHF device but may be a device that communicates over a wireless LAN defined in IEEE 802.11 or a wired LAN defined in IEEE 802.3. The power supply 70 is a lithium-ion battery and functions as a power source for the electric aircraft 20. The power supply 70 supplies three-phase AC power to the motor 11 in each EPU 10 through the inverter 121. The power supply 70 may not be a lithium-ion battery but may be any secondary battery, such as a nickel metal hydride battery, and in place of the secondary battery or in addition to the secondary battery, any power source such as a fuel cell or an electric generator may be used.

The electric aircraft 20 having the above-described configuration includes the multiple rotors 30 and the multiple EPUs 10. In this structure, the power supplied to the individual rotors is smaller than in an aircraft with fewer rotors 30, such as a helicopter. In other words, the power output from each EPU 10 to the rotor 30 is relatively small. Thus, if an event such as gusts of wind, a lightning strike, or a bird strike occurs, the detection values (output values) of the voltage sensor 13, the current sensor 14, and the rotation sensor 15 may vary considerably. On the other hand, because of the large number of EPUs 10, fluctuations in the output from some EPUs 10 do not immediately result in flight difficulties. Accordingly, there is little need for an immediate action to reduce the fluctuations in the EPU 10. When the sensor detection values vary considerably, the electric aircraft 20 performs EPU control processing described later to take an appropriate action based on such characteristics of the electric aircraft 20.

A2. EPU Control Processing

Figure 3:
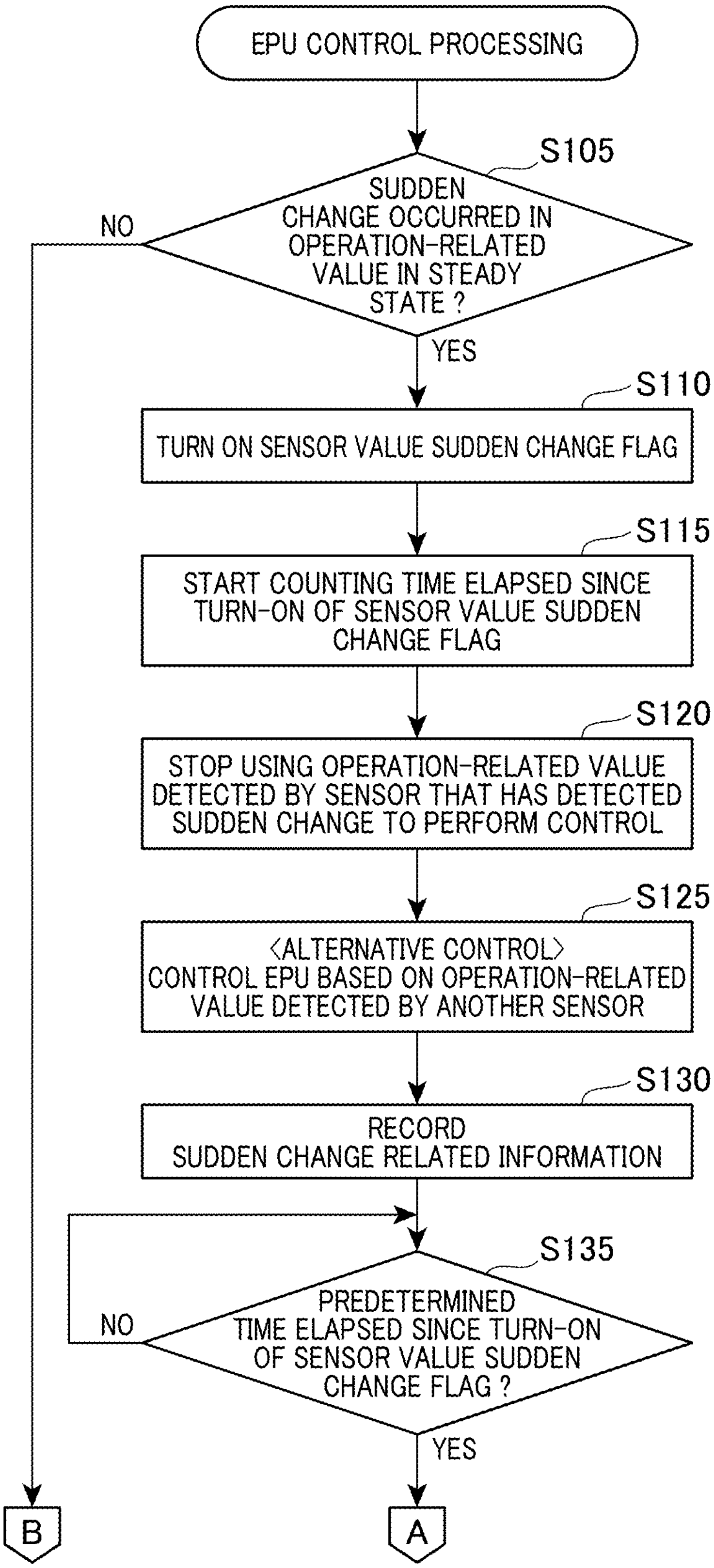
FIG. 3 is a flowchart showing the procedure of EPU control processing in a first embodiment.
Figure 4:
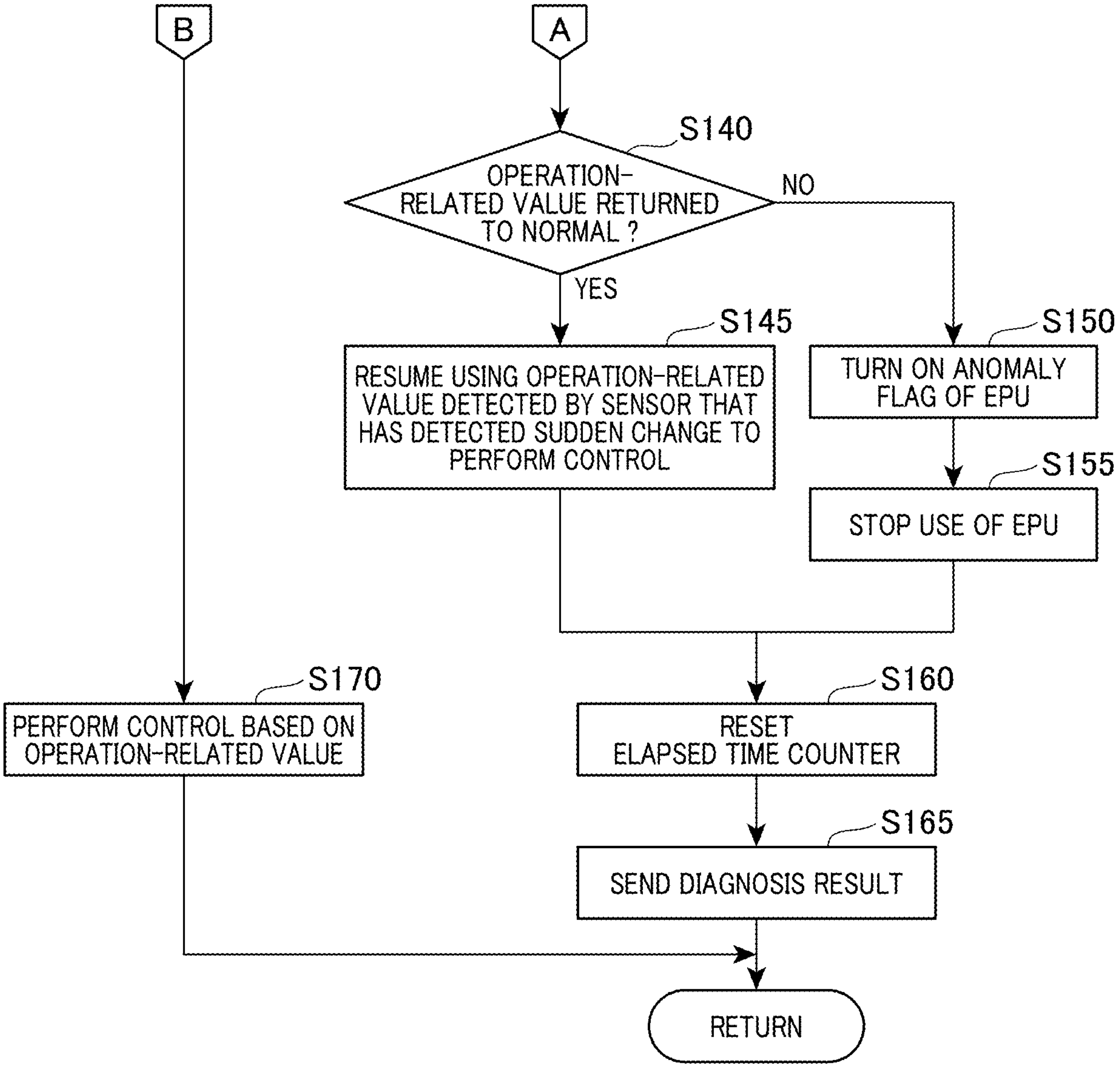
FIG. 4 is a flowchart showing the procedure of the EPU control processing in the first embodiment.

FIGS. 3 and 4 show EPU control processing started when the electric drive system 100 (each EPU 10 and the control device 110) is turned on. The EPU control processing is processing for controlling each EPU 10 in a normal state and also processing for taking an appropriate action when the operation-related values described later suddenly change due to, for example, an event such as a lightning strike.

The control unit 112 determines whether a sudden change has occurred in the operation-related values in a steady state (step S105). The operation-related values are values related to the operation state of the EPU 10. Specifically, in the present embodiment, the operation-related values refer to the driving current (phase current) in each phase of the motor 11, the voltage supplied from the power supply 70, and the rotational speed of the motor 11. These operation-related values are detected by the voltage sensor 13, the current sensor 14, and the rotation sensor 15 and sent from each EPU 10 to the control device 110 (the control unit 112). The sudden change refers to a change in an operation-related value beyond a predetermined range within a predetermined time. The predetermined time refers to a period for detecting a sudden change in a sensor. For example, the period corresponds to 100 milliseconds. Note that a sudden change may be detected within any period other than 100 milliseconds. Thus, when the difference from the operation-related values detected in the previous period is beyond the predetermined range, this may be referred to as a sudden change. The steady state refers to a state in which the target value of the power supplied from the EPU 10 to the rotor 30 does not change beyond a predetermined range within a predetermined time. The target value (torque command value) of the power is a value sent from the control device 110 to the control circuit 122 in each EPU 10, and the control circuit 122 controls the inverter 121 in accordance with such a target value. In the present embodiment, the target value is periodically sent from the EPU 10 to the control circuit 122 every predetermined time, such as 100 milliseconds. In this context, the above expression "a change in the target value of the power beyond a predetermined range within a predetermined time" means that the periodically sent target values change beyond the predetermined range. The predetermined range refers to, for example, a range within 10%. Note that the range is not limited to a range within 10% but may be any other range. The target value of the power may change beyond the predetermined range within the predetermined time, for example, immediately after the start of a vertical takeoff or when the speed is suddenly increased during horizontal flight.

If it is determined that no sudden change has occurred in the operation-related values in the steady state (NO in step S105), as illustrated in FIG. 4, the control unit 112 controls the EPU 10 using the operation-related values detected by the sensors 13 to 15 (step S170). After step S170, the processing returns to step S105. In contrast, if it is determined that a sudden change has occurred in the operation-related values in the steady state (YES in step S105), as illustrated in FIG. 3, the control unit 112 turns on a sensor value flag (step S110). The sensor value sudden change flag is a flag indicating that a sudden change in a sensor value, that is, in operation related information, has occurred in the steady state. The control unit 112 starts counting the time elapsed since the sensor value sudden change flag is turned on (step S115).

The control unit 112 stops using the operation-related value detected by the sensor that has detected the sudden change to perform control (step S120). For example, when a sudden change occurs in the rotational speed detected by the voltage sensor 13 in an EPU 10, the control unit 112 stops using the operation-related value (rotational speed) detected by the voltage sensor 13 to control the EPU 10.

The control unit 112 performs alternative control (step S125). The alternative control refers to use the operation-related value detected by another sensor than the sensor that has detected the sudden change to control the EPU 10. In the present embodiment, the phrase "another sensor" refers to another sensor in the EPU 10 including the sensor that has detected the sudden change. For example, when a sudden change is detected in the voltage sensor 13, the rotation sensor 15 included in the same EPU 10 may be chosen. The control unit 112 estimates the voltage value using the detection value (rotational speed) detected by the rotation sensor 15 and uses the voltage value to determine the details of control over the EPU 10. The estimation of the voltage value based on the rotational speed may be achieved by, for example, estimating the voltage phase from the rotational speed and the target value (torque command value) inputter to the control circuit 122 and also estimating the voltage amplitude by mapping the correspondence between the rotational speed and the voltage amplitude in advance and referring to the map using the rotational speed as a key. In the present embodiment, the sensor that has detected the sudden change corresponds to a first sensor in the present disclosure, and another sensor in the EPU 10 including the sensor that has detected the sudden change corresponds to a second sensor in the present disclosure.

The control unit 112 records sudden change related information in the storage 113 (step S130). The phrase "sudden change related information" refers to information related to a sudden change, or specifically, an event in which an operation-related value changes beyond the predetermined range within the predetermined time. In the present embodiment, the sudden change related information refers to information (e.g., ID) for identifying the EPU 10 including the sensor that has detected the sudden change in the multiple EPUs 10, the time of the occurrence of the sudden change, and the location information about the electric aircraft 20 at the time of the occurrence of the sudden change. The records of the sudden change related information enable these information items to be used to identify the cause of the sudden change later. For example, if it is determined that there were thunderclouds at the location at the time based on the above information, the cause of the sudden change is probably a lightning strike. In addition, the time of the occurrence of the sudden change and the location information about the electric aircraft 20 at the time of the occurrence of the sudden change may be used to alert other aircraft. In this case, the other aircraft may be directly alerted through the communication device 60 or indirectly alerted via a control center. It is noted that one or two of the three information items described above may not be included. Furthermore, in place of the three information items or in addition to the three information items, any information related to sudden changes may be included.

The control unit 112 determines whether a predetermined time has elapsed since the sensor value sudden change flag was turned on (step S135). If it is determined that the predetermined time has not elapsed since the sensor value sudden change flag was turned on (NO in step S135), step S135 is performed again. That is, the control unit 112 waits for the predetermined time since the sensor value sudden change flag was turned on. The predetermined time in step S135 is determined in advance based on the time taken for the rotation of the motor 11 to temporarily become anomalous and then return to normal (hereinafter, referred to as the recovery time) in response to the occurrence of an event accompanied by a sudden change in the operation-related values, for example, an accident such as gusts of wind, a lightning strike, or a bird strike during a flight of the electric aircraft 20. Specifically, the recovery times for such accidents may be identified by experiments or simulations, and the maximum time in these recovery times or the maximum time with an additional predetermined margin may be determined as the predetermined time. For example, when the recovery time for gusts of wind is a few seconds, the recovery time for a lightning strike ranges from a few milliseconds to tens of milliseconds, and the recovery time for a bird strike is hundreds of milliseconds, the predetermined time may be set to, for example, five seconds based on the longest time, "a few seconds."

If it is determined that the predetermined time has elapsed since the sensor value sudden change flag was turned on (YES in step S135), as shown in FIG. 4, the control unit 112 determines whether the operation-related value detected by the sensor that has detected the sudden change has returned to normal (step S140). The determination as to whether the operation-related value has returned to normal may be, for example, based on whether the difference (the level of difference) between the operation-related value detected by the sensor and the target value is equal to or smaller than a predetermined threshold. Specifically, when the difference is equal to or smaller than the predetermined threshold, it may be determined that the operation-related value has returned to normal, whereas when the difference is greater than the predetermined threshold, it may be determined that the operation-related value has not returned to normal.

If it is determined that the operation-related value detected by the sensor that has detected the sudden change has returned to normal (YES in step S140), the control unit 112 resumes using the operation-related value detected by the sensor that has detected the sudden change to perform control (step S145). If the operation-related value detected by the sensor that has detected the sudden change returns to normal upon the elapse of the predetermined time after the sensor value sudden change flag is turned on, the sudden change is probably a temporary change caused by an accident such as gusts of wind, a lightning strike, or a bird strike. In this case, few problems are thus caused by resuming using the operation-related value detected by the sensor to perform control.

If it is determined that the operation-related value detected by the sensor that has detected the sudden change has not returned to normal (NO in step S140), the control unit 112 turns on the anomaly flag of the corresponding EPU 10 (step S150) and stops the use of the EPU 10 (step S155). The anomaly flag is a flag indicating that an anomaly (permanent anomaly) has occurred in the EPU 10. The flag is, for example, used in maintenance to determine the occurrence of the permanent anomaly. The flag may include, for example, information (e.g., ID) for identifying the EPU 10. If the operation-related value detected by the sensor that has detected the sudden change does not return to normal upon the elapse of the predetermined time after the sensor value sudden change flag is turned on, the anomaly is probably a permanent anomaly caused by, for example, a failure in the EPU 10 or the sensor rather than a temporary anomaly caused by an accident such as gusts of wind, a lightning strike, or a bird strike. In this case, the use of the EPU 10 is stopped accordingly. The stop of the use of the EPU 10 means stopping the supply of power from the EPU 10 to the rotor 30.

After the completion of step S145 or S155 above, the control unit 112 resets the elapsed time counter (step S160). The control unit 112 sends the diagnosis result (step S165). In the present embodiment, the control unit 112 notifies the pilot in the electric aircraft 20 of the on or off state of the anomaly flag and the occurrence of the sudden change in the operation-related value through the UI unit 50. The control center may be notified through the communication device 60. After the completion of step S165, the processing returns to step S105.

Figure 5:
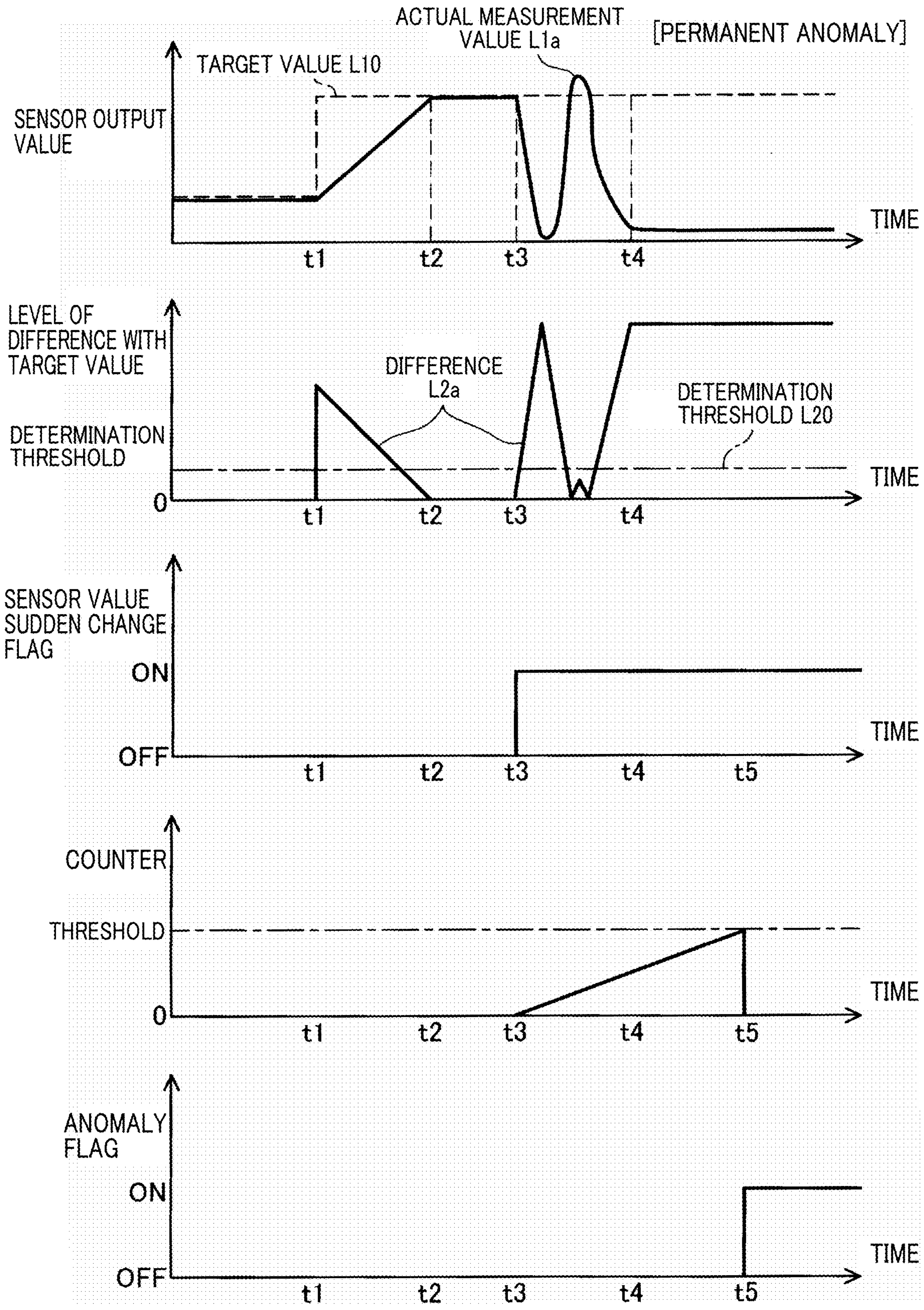
FIG. 5 is a timing chart showing an example of changes in sensor output values, the level of difference from a target value, a sensor value sudden change flag, a counter, and an anomaly flag in the event of a permanent anomaly.
Figure 6:
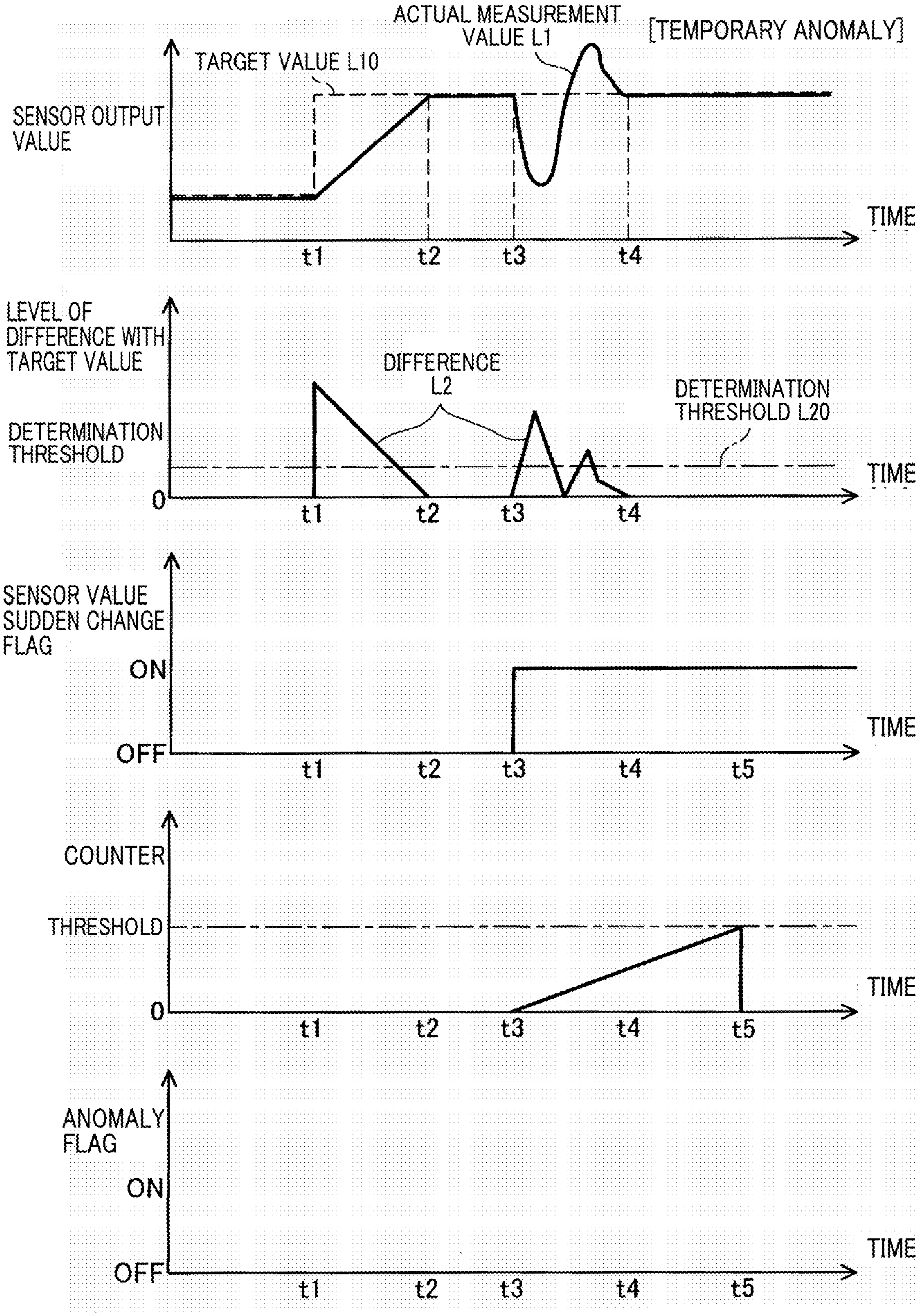
FIG. 6 is a timing chart showing an example of changes in sensor output values, the level of difference from the target value, the sensor value sudden change flag, the counter, and the anomaly flag in the event of a temporary anomaly.

In FIGS. 5 and 6, the top graph is a timing chart showing an example of chronological changes in sensor output values. The second graph from the top is a timing chart showing an example of chronological changes in the difference between the target value and the sensor output values (actual measurement values). The third graph from the top is a timing chart showing an example of chronological changes in the sensor value sudden change flag. The fourth graph from the top is a timing chart showing an example of chronological changes in the counter. The bottom graph is a timing chart showing an example of chronological changes in the anomaly flag. FIG. 5 shows each timing chart for the occurrence of a permanent anomaly, and FIG. 6 shows each timing chart for the occurrence of a temporary anomaly.

In the example of the occurrence of a permanent anomaly shown in FIG. 5, a target value L10 increases sharply at times t1 to t2. For example, this is a case in which the target value of the rotational speed or the like increases sharply for a vertical takeoff. The period of times t1 to t2 corresponds to a transitional state in which the target value changes sharply. In this case, the difference L2_a_ between the target value and the sensor value (actual measurement value) L1_a_ peaks at time t1 and gradually decreases to time t2. At time t2, when the condition reaches the steady state, the difference L2_a_ becomes zero. Then, at time t3, upon the occurrence of a permanent anomaly, such as a failure in a sensor, the target value L10 remains constant while sensor output values vary greatly. Accordingly, the difference L2_a_ also varies greatly. At time t3, in the steady state, a sudden change occurs in the sensor output value (operation-related value), thus turning the sensor value sudden change flag from off to on. In response, the counter starts counting at time t3. Also at time t5, at which the predetermined time has elapsed, the sensor output value is far from the target value, and the level of difference L2_a_ is still higher than a determination threshold L20. In this case, the anomaly flag is thus turned on at time t5.

In the example of the occurrence of a temporary anomaly shown in FIG. 6, the target value L10 increases sharply at times t1 to t2 in the same manner as in the example of FIG. 5. Then, at time t3, a temporary anomaly occurs due to, for example, a lightning strike, and the sensor output value (operation-related value) L1 varies greatly until time t4. Accordingly, similarly to the example in FIG. 5, the difference L2 increases, and the sensor value sudden change flag is turned from off to on at time t3. However, upon the end of fluctuations in the sensor output value at time t4, the difference L2 becomes zero. The difference L2 is thus equal to or smaller than the determination threshold L20, and the anomaly flag is still off at time t5.

The control device 110 according to the first embodiment described above, in the event of a sudden change, stops using the operation-related value detected by the first sensor (the sensor that has detected the sudden change) to control the EPU 10, thus preventing unstable operation of the electric aircraft 20 caused by control over the EPU 10 using the suddenly changed operation-related value. After the occurrence of the sudden change, when the sudden change ends before the predetermined period elapses, the control over the EPU 10 using the operation-related value detected by the first sensor is resumed, thus preventing the control over the EPU 10 using the operation-related value detected by the first sensor from being permanently stopped due to temporary fluctuations in the operation-related value. After the occurrence of the sudden change, when the sudden change has not ended at the end of the predetermined period, the control over the EPU 10 using the operation-related value detected by the first sensor continues to be stopped, thus more reliably preventing unstable operation of the electric aircraft 20 caused by control over the EPU 10 using the suddenly changed operation-related value.

Furthermore, in the event of a sudden change, the sudden change related information, which is information related to the occurrence of the sudden change, is recorded in the storage 113 and as information useful in identifying the cause of the sudden change later.

The sudden change related information includes information that can identify the EPU 10 in which the sudden change has occurred in the multiple EPUs 10, and the information can thus be recorded in the storage 113. This recorded information enables easy determination of the EPU 10 that is to be subjected to a later maintenance checkup.

The sudden change related information also includes the time of the occurrence of the sudden change and location information about the electric aircraft at the time of the occurrence of the sudden change, and these information items may be used to identify the cause of the sudden change or alert other electric aircraft.

Furthermore, when a sudden change occurs in the steady state, the control over the EPU 10 using the operation-related value detected by the first sensor is stopped, thus preventing the control over the EPU 10 from being inappropriately stopped based on a sudden change in the operation-related value in a transitional state. After the occurrence of a sudden change in the steady state, when the sudden change ends before the predetermined period elapses, the control over the EPU 10 using the operation-related value detected by the first sensor is resumed, thus preventing the control over the EPU 10 using the operation-related value detected by the first sensor from being permanently stopped due to temporary fluctuations in the operation-related value in the steady state. After the occurrence of a sudden change in the steady state, when the sudden change has not ended at the end of the predetermined period, the control over the EPU 10 using the operation-related value detected by the first sensor continues to be stopped, thus more reliably preventing unstable operation of the electric aircraft 20 caused by control over the EPU 10 using the suddenly changed operation-related value in the steady state.

In the event of a sudden change, the operation-related value detected by the second sensor (another sensor in the EPU 10 including the sensor that has detected the sudden change) is used to control the EPU 10 in which the sudden change has occurred, thus enabling the EPU 10 to be controlled more appropriately than in a system that controls the EPU 10 using the operation-related value detected by the first sensor in which a sudden change has occurred.

Furthermore, in the event of a sudden change, the EPU 10 in which the sudden change has occurred stops the supply of power to the rotor 30, thus preventing unstable operation of the electric aircraft 20 caused by the supply of power to the rotor 30 from the EPU 10 that may have a permanent anomaly.

B. Second Embodiment

An electric aircraft 20 and an electric drive system 100 in a second embodiment have the same configuration as the electric aircraft 20 and the electric drive system 100 in the first embodiment, and a detailed description thereof is omitted by using like reference signs to denote identical components.

Figure 7:
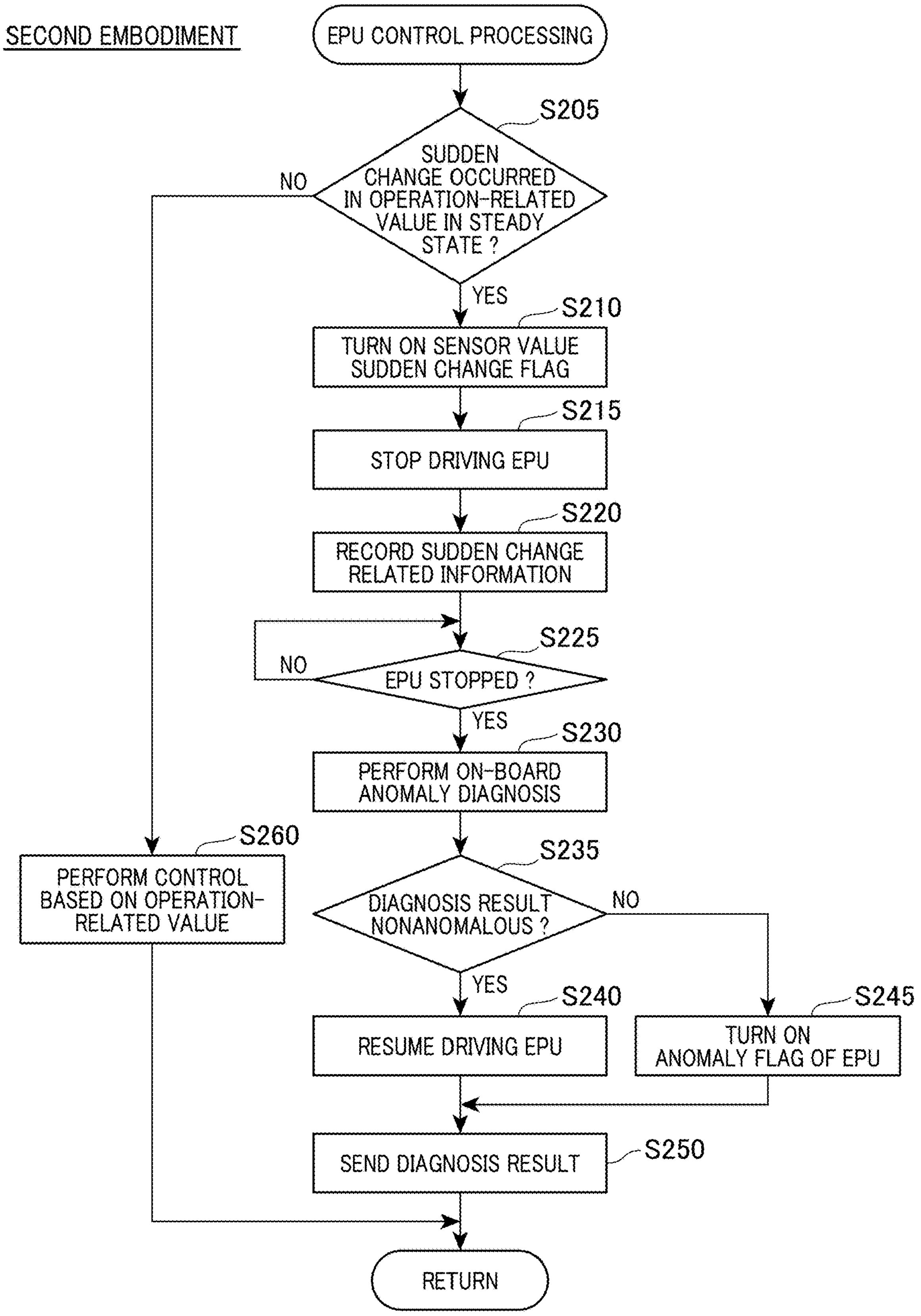
FIG. 7 is a flowchart showing the procedure of EPU control processing in a second embodiment.

FIG. 7 shows EPU control processing according to the second embodiment started when the electric drive system 100 (each EPU 10 and the control device 110) is turned on, similarly to the first embodiment.

The control unit 112 determines whether a sudden change has occurred in the operation-related values in a steady state (step S205). Step S205 is the same as step S105 of the EPU control processing in the first embodiment. If it is determined that no sudden change has occurred in the operation-related values in the steady state (NO in step S205), similarly to the first embodiment, step S205 is repeated while the EPU 10 is controlled using the operation-related values detected by the sensors 13 to 15 (step S260). In contrast, if it is determined that a sudden change has occurred in the operation-related values in the steady state (YES in step S205), the control unit 112 turns on a sensor value flag (step S210). Step S210 is the same as step S110 of the EPU control processing in the first embodiment.

The control unit 112 stops driving the EPU 10 including the sensor that has detected the sudden change (step S215). Stopping the driving of the EPU 10 means the stop of the supply of power from the EPU 10 to the rotor 30. The control unit 112 records the sudden change related information in the storage 113 (step S220). Step S220 is the same as step S130 of the EPU control processing in the first embodiment.

The control unit 112 determines whether stopping the driving of the EPU 10 has been completed (step S225) and if determining that the stopping has not yet been completed (NO in step S225), repeats step S225. In contrast, if determining that stopping the driving of the EPU 10 has been completed (YES in step S225), the control unit 112 conducts an on-board diagnosis for the EPU 10 whose driving has been stopped (step S230). In the present embodiment, the on-board diagnosis is as follows. First, a torque command value smaller than a usual target value (a target value to be output in the normal state) is output so as to rotate the rotor 30 to the extent that the rotation does not significantly affect the flight, and the motor 11 is controlled based on the torque command value. Then, it is determined whether the sensor output value (detected value) in this case from the sensor that has detected the sudden change is within a predetermined normal range. If the values are within the range, it is determined that the condition is nonanomalous (normal), and if the values are out of the range, it is determined that the condition is anomalous.

The control unit 112 determines whether the condition is nonanomalous based on the result of the on-board anomaly diagnosis (step S235). If the condition is determined to be nonanomalous (YES in step S235), the control unit 112 resumes driving the EPU 10 (step S240). In contrast, if the condition is determined to be not nonanomalous (anomalous) (NO in step S235), the control unit 112 turns on the anomaly flag of the EPU 10 (step S245). In this case, driving of the EPU 10 is not resumed. After the completion of step S240 or step S245, the control unit 112 sends the diagnosis result (step S250). Step S250 is the same as step S165 of the EPU control processing in the first embodiment.

The control device 110 according to the second embodiment described above, in the event of a sudden change, stops the supply of power that depends on the target value to the rotor 30 from the EPU 10 (anomalous unit) including the sensor that has detected the sudden change, thus preventing unstable operation of the electric aircraft 20 caused by control over the EPU 10 using the operation-related value detected by the sensor (first sensor) included in the anomalous unit and having detected the sudden change. Furthermore, since the anomalous unit is to be driven with a target value smaller than the target value, and the operation-related value detected by the first sensor is used to determine whether the anomalous unit is normal, the determination based on the actual operation of the anomalous unit can improve the determination accuracy. If the anomalous unit is determined to be normal, the control over the EPU 10 using the operation-related value detected by the first sensor is resumed, thus preventing the control over the EPU 10 using the operation-related value detected by the first sensor from being permanently stopped due to temporary fluctuations in the operation-related value. If the anomalous unit is determined to be not normal, the control over the EPU 10 using the operation-related value detected by the first sensor continues to be stopped, thus more reliably preventing unstable operation of the electric aircraft 20 caused by control over the EPU 10 using the suddenly changed operation-related value.

C. Third Embodiment

An electric aircraft 20 and an electric drive system 100 in a third embodiment are different from the electric aircraft 20 and the electric drive system 100 in the first embodiment in that a single rotor 30 is driven by a pair of EPUs 10. The other components in the electric aircraft 20 and the electric drive system 100 in the third embodiment are the same as the electric aircraft 20 and the electric drive system 100 in the first embodiment, and a detailed description thereof is omitted by using the same reference signs to denote the same components.

Figure 8:
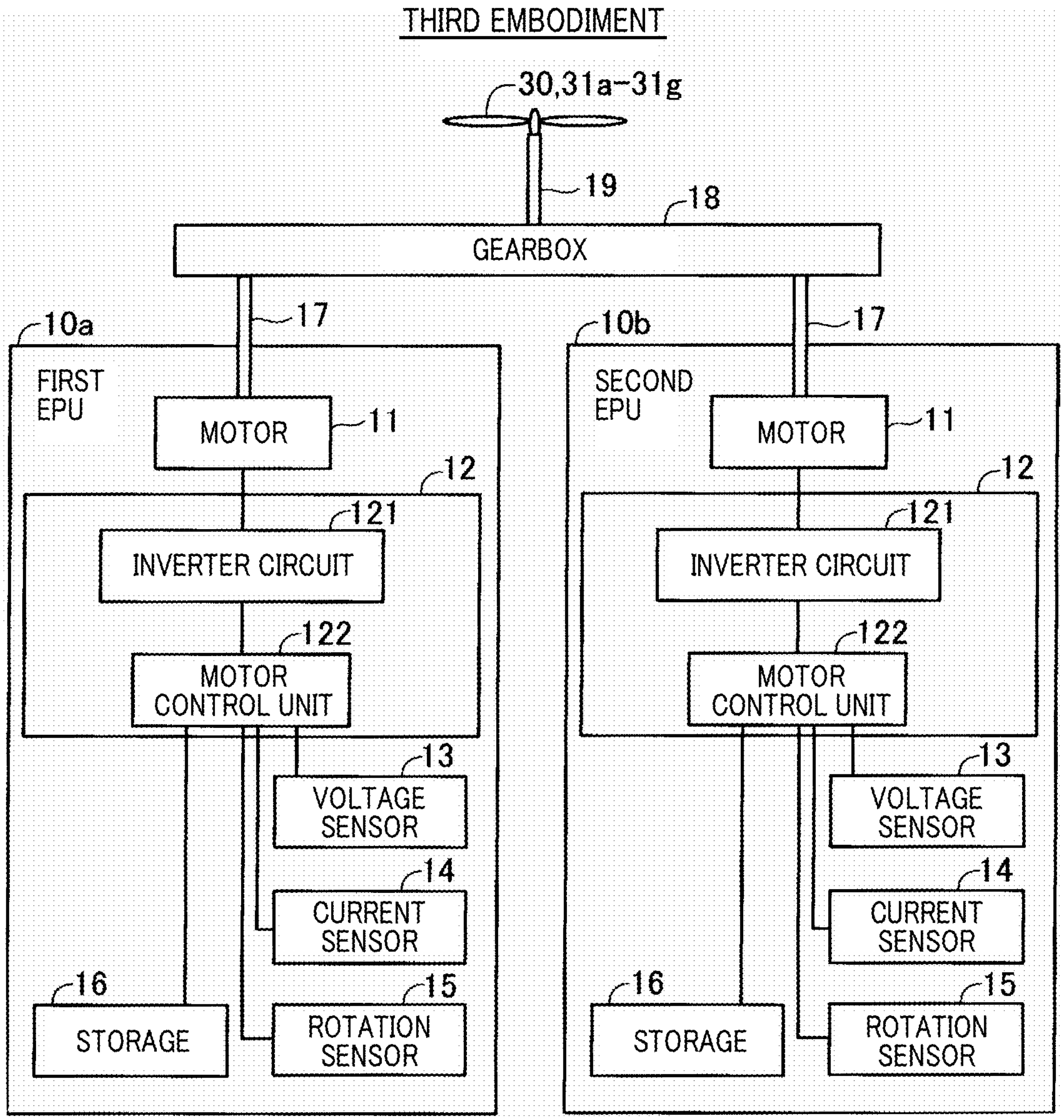
FIG. 8 is a functional block diagram of a part of an electric drive system in a third embodiment.

As illustrated in FIG. 8, a rotor 30 is driven by a first EPU 10*a* and a second EPU 10*b*. The two EPUs 10*a* and 10*b* each have the same configuration as the EPU 10 in the first embodiment. The two EPUs 10*a* and 10*b* each have a shaft 17 that can transmit power to the rotor 30 via a single gearbox 18 and a single shaft 19. Although FIG. 8 illustrates the configuration of a single rotor 30, all the other rotors 30 have the same configuration.

The EPU control processing in the third embodiment is different from the EPU control processing in the first embodiment in the details of the alternative control (step S125), and the other steps are the same as in the EPU control processing in the first embodiment.

For the alternative control in the first embodiment, the operation-related value detected by another sensor in the EPU 10 including the sensor that has detected a sudden change is used to control the EPU 10. In the alternative control in the third embodiment, the control unit 112 controls the EPU 10 by using the operation-related value detected by a sensor included in the EPU paired with the EPU including the sensor that has detected a sudden change. For example, when the voltage sensor 13 in the first EPU 10*a* detects a sudden change, the operation-related value detected by the voltage sensor 13 in the second EPU 10*b* is used to control the EPU 10.

The control device 110 according to the third embodiment described above provides the same effects as the control device 110 in the first embodiment. In addition, when a sudden change is detected in operation-related values in the steady state, the EPU 10 is controlled by using the operation-related value detected by a sensor included in the EPU paired the EPU including the sensor that has detected the sudden change, thus enabling the EPU to be controlled more appropriately.

D. Fourth Embodiment

An electric aircraft 20 and an electric drive system 100 in a fourth embodiment have the same configuration as the electric aircraft 20 and the electric drive system 100 in the first embodiment, and a detailed description thereof is omitted by using the same reference signs to denote the same components.

Figure 9:
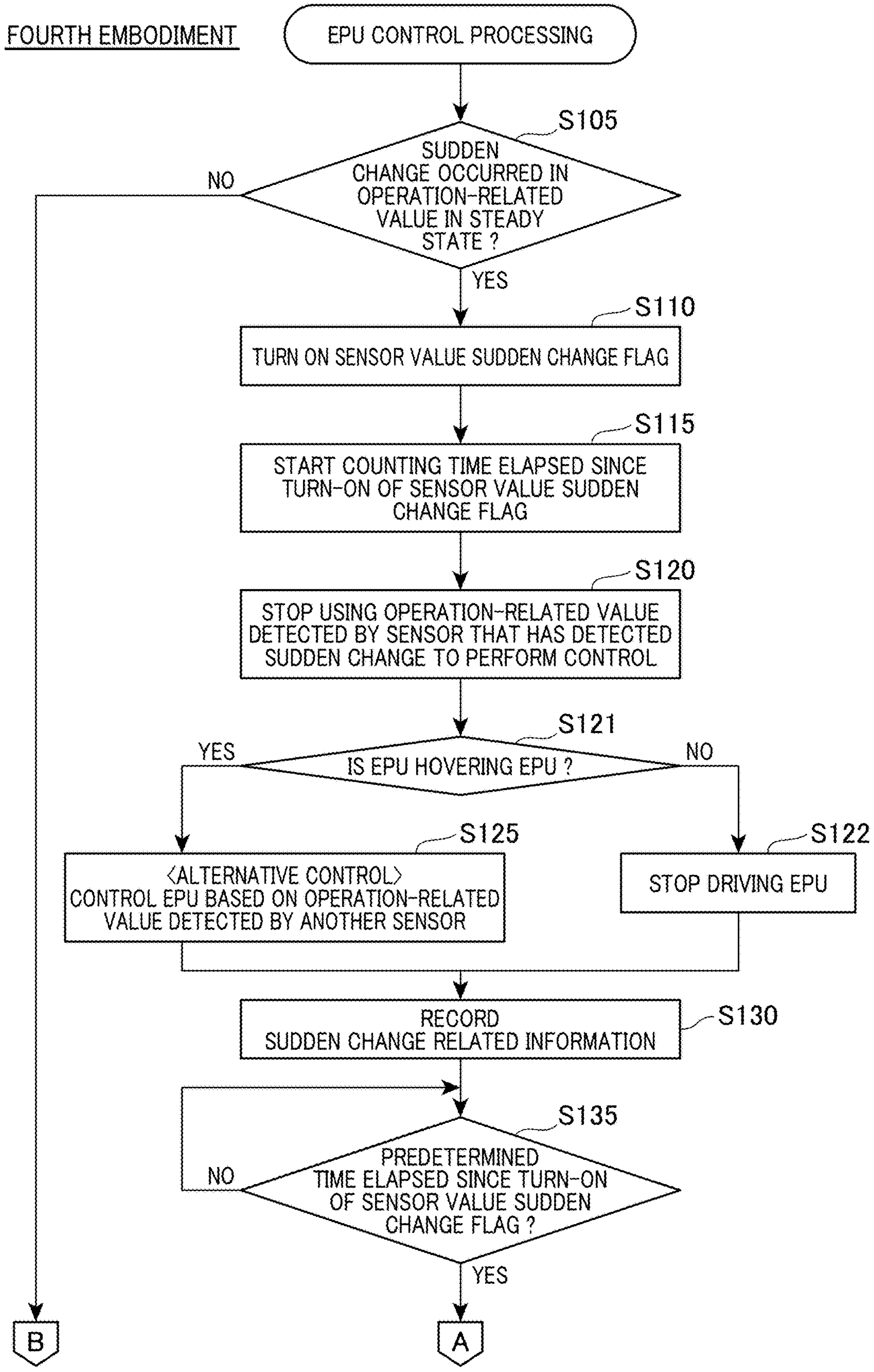
FIG. 9 is a flowchart showing the procedure of EPU control processing in a fourth embodiment.

The EPU control processing in the fourth embodiment shown in FIG. 9 is different from the EPU control processing in the first embodiment shown in FIG. 3 in that steps S121 and S122 are additionally executed. In the EPU control processing in the fourth embodiment, the other steps including, for example, the procedure shown in FIG. 4 are the same as in the EPU control processing in the first embodiment, and a detailed description thereof is omitted by using the same reference signs to denote the same steps.

As illustrated in FIG. 9, after the completion of step S120 above, the control unit 112 determines whether the EPU including the sensor (first sensor) that has detected the sudden change is a hovering EPU (step S121). If the EPU is determined to be a hovering EPU (YES in step S121), step S125 above is executed. Accordingly, in this case, the operation-related value detected by another sensor than the sensor that has detected the sudden change is used to control the EPU 10.

If the EPU is determined to be not a hovering EPU, or determined to be a cruising EPU (NO in step S121), the control unit 112 stops driving of the EPU (step S122). After the completion of step S125 or S122 above, step S130 above is executed.

As described above, when the EPU including the sensor (first sensor) that has detected a sudden change is a hovering EPU, alternative control is performed. This is intended to continue driving to the extent possible because the stop of driving of a hovering EPU greatly affects the flight of the electric aircraft 20. In contrast, even when driving of a cruising EPU is stopped, the electric aircraft 20 can continue cruising (travelling horizontally) for a certain period of time by gliding with the current kinetic energy and the main wings 25, and the stop of driving of the cruising EPU has little effect. Conversely, when the cruising EPU 10 continues to be driven with the sensor or the EPU 10 malfunctioning, the flight stability of the electric aircraft 20 may be compromised. Thus, when the EPU including the sensor (first sensor) that has detected a sudden change is a cruising EPU, driving of the EPU is stopped without alternative control.

The control device 110 according to the fourth embodiment described above provides the same effects as the control device 110 in the first embodiment. When a cruising rotor stops, the electric aircraft 20 can glide using the current kinetic energy, and the flight of the electric aircraft 20 is thus less affected than when a hovering rotor stops. When a sudden change occurs and the EPU 10 in which the sudden change has occurred is a hovering propulsion unit, the control device 110 according to the fourth embodiment uses the operation-related value detected by another sensor (second sensor) to control the hovering propulsion unit in which the sudden change has occurred, thus preventing unstable operation of the electric aircraft 20 compared with a system that stops the supply of power from the hovering propulsion unit to the hovering rotor. When a sudden change occurs and the EPU 10 in which the sudden change has occurred is a cruising propulsion unit, the cruising propulsion unit stops the supply of power to the cruising rotor in which the sudden change has occurred, thus preventing unstable operation of the electric aircraft 20 caused by the supply of power from the EPU 10 using the suddenly changed operation-related value.

E. Fifth Embodiment

Figure 10:
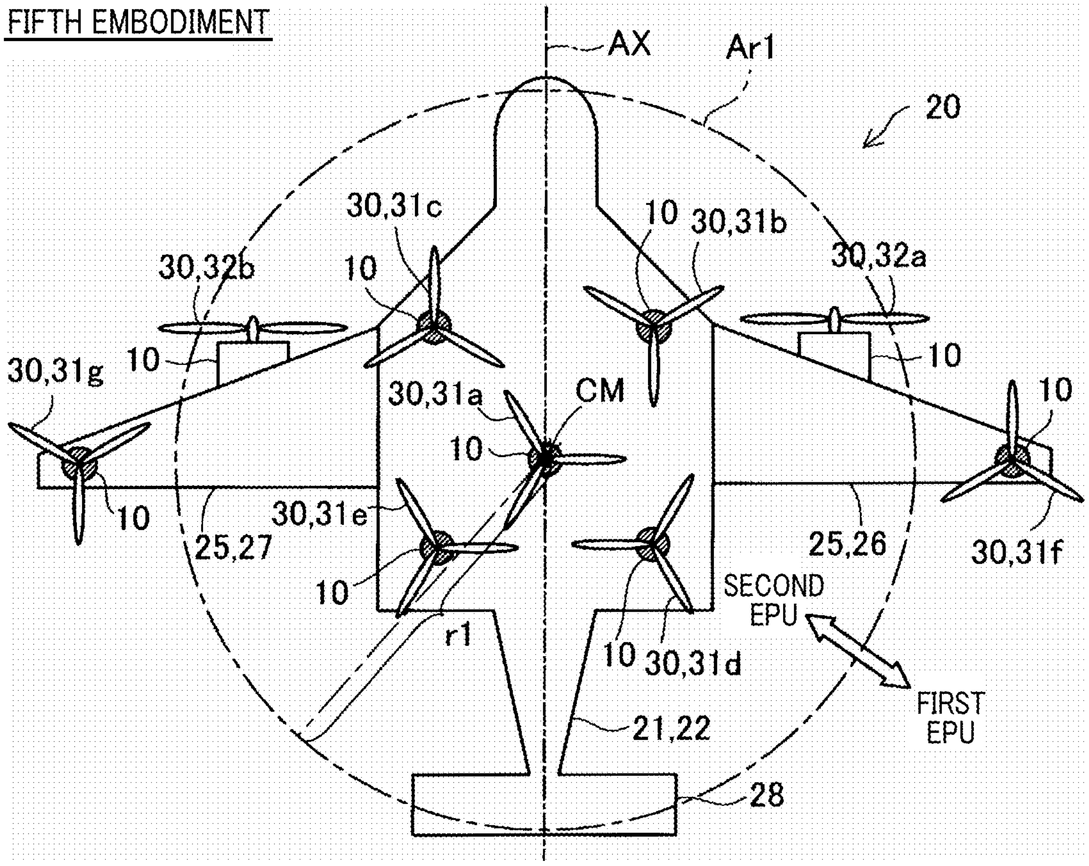
FIG. 10 is a diagram illustrating the division between first EPUs and second EPUs in a fifth embodiment.
Figure 11:
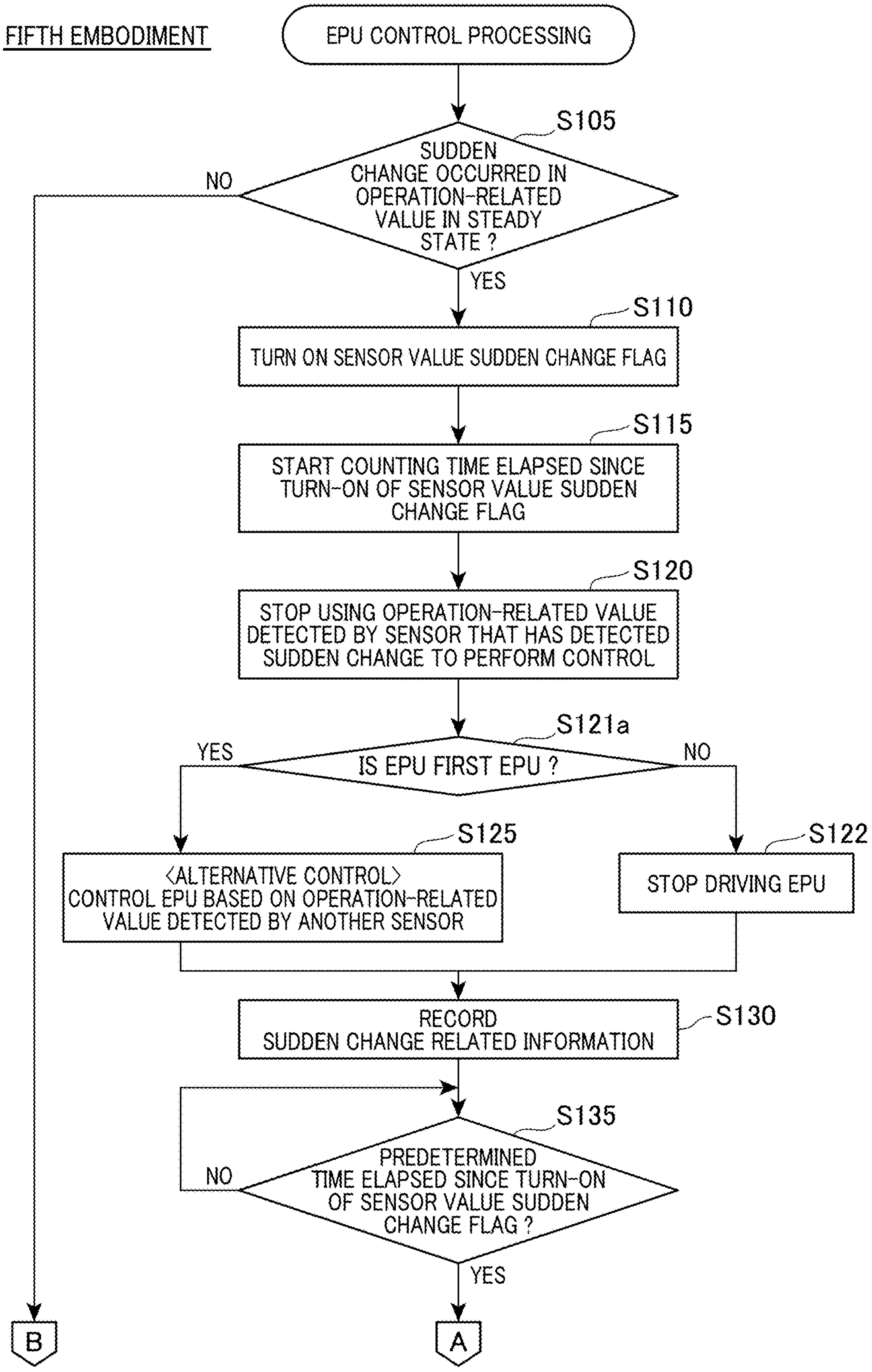
FIG. 11 is a flowchart showing the procedure of EPU control processing in the fifth embodiment.

An electric aircraft 20 in a fifth embodiment is different from the electric aircraft 20 in the first embodiment in that nine EPUs 10 are divided into first EPUs and second EPUs. The first EPUs refer to EPUs 10 that power rotors 30 (hereinafter, also referred to as the first rotors) located relatively far from the body gravity center CM, whereas the second EPUs refer to EPUs 10 that power rotors 30 (hereinafter, also referred to as the second rotors) located relatively near to the body gravity center CM. Specifically, in the fifth embodiment, as illustrated in FIG. 10, the first EPUs are the EPUs 10 corresponding to the rotors 30 located outside an area Ar1 within a predetermined threshold distance r1 from the body gravity center CM, whereas the second EPUs are the EPUs 10 corresponding to the rotors 30 located inside the area Ar1. Accordingly, the first EPUs are the EPUs 10 corresponding to the hovering rotor 31*f* and the hovering rotor 31*g*, and the second EPUs are the seven EPUs 10 corresponding to the other seven rotors 30 (the five hovering rotors 31*a* to 31*e* and the two cruising rotors 32*a* and 32*b*).

The EPU control processing in the fifth embodiment shown in FIG. 5 is different from the EPU control processing in the fourth embodiment shown in FIG. 9 in that step S121*a* is additionally executed in place of step S121. In the EPU control processing in the fifth embodiment, the other steps including, for example, the procedure shown in FIG. 4 are the same as in the EPU control processing in the fourth embodiment, and a detailed description thereof is omitted by using the same reference signs to denote the same steps.

As illustrated in FIG. 9, after the completion of step S120 above, the control unit 112 determines whether the EPU including the sensor that has detected the sudden change (first sensor) is a first EPU (step S121*a*). If the EPU is determined to be a first EPU (YES in step S121*a*), step S125 above is executed. Accordingly, in this case, the operation-related value detected by another sensor than the sensor that has detected the sudden change is used to control the EPU 10.

If the EPU is determined to be not a first EPU, that is, determined to be a second EPU (NO in step S121*a*), the control unit 112 stops driving of the EPU (step S122). After the completion of step S125 or S122 above, step S130 above is executed.

As described above, when the EPU including the sensor (first sensor) that has detected a sudden change is a first EPU, alternative control is performed. This is intended to continue driving to the extent possible because the deactivation of a first EPU greatly affects the flight of the electric aircraft 20. Since a first EPU powers a first rotor located far from the body gravity center CM, if driving is stopped, the corresponding rotor 30 stops rotating. The stop of a rotor 30 located far from the body gravity center CM greatly affects the attitude stability during the flight of the electric aircraft 20. For this reason, the first rotor is to continue the rotation to the extent possible, and in the present embodiment, the first EPU is subjected to alternative control. In contrast, since the second rotors are located near to the body gravity center CM, the stop of driving has relatively little effect on the flight attitude. Conversely, when a second EPU continues to be driven with the sensor or the EPU 10 malfunctioning, the flight stability of the electric aircraft 20 may be compromised. Thus, when the EPU including the sensor (first sensor) that has detected a sudden change is a second EPU, driving of the EPU is stopped without alternative control.

The control device 110 according to the fifth embodiment described above provides the same effects as the control device 110 in the first embodiment. In addition, when a sudden change occurs and the EPU 10 in which the sudden change has occurred is a first EPU, the operation-related value detected by the second sensor is used to control the first EPU in which the sudden change has occurred, thus preventing the operation of the electric aircraft 20 from becoming too unstable due to the stop of the first rotor located farther from the body gravity center CM and thus having a greater effect when stopped. When a sudden change occurs and the EPU 10 in which the sudden change has occurred is a second EPU, the second EPU in which the sudden change has occurred stops the supply of power to the second rotor, thus preventing unstable operation of the electric aircraft 20 caused by the supply of power from the second EPU using the suddenly changed operation-related value.

F. Modified Embodiments

(F1) Modified Embodiment 1

In the EPU control processing in each embodiment, the recording of the sudden change related information (steps S130, S220) may be omitted.

(F2) Modified Embodiment 2

Although the presence or absence of a sudden change in operation-related values is determined in the steady state in each embodiment, the present disclosure is not limited to the embodiment. The presence or absence of a sudden change may be determined also in the transitional state. In such an embodiment, the degree of change (the rate of change) in operation-related values in the transitional state may be determined in advance, and a change exceeding the degree of change by at least a predetermined level may be determined as a sudden change.

(F3) Modified Embodiment 3

In the first, fourth, and fifth embodiments, the EPU 10 including the sensor that has detected a sudden change is subjected to alternative control that uses the operation-related value detected by another sensor in the EPU 10 to control the EPU 10. In the third embodiment, the EPU 10 is controlled using the operation-related value detected by a sensor included in the EPU paired with the EPU including the sensor that has detected a sudden change. The present disclosure is not limited to these embodiments. For example, when a sensor included in the EPU 10 corresponding to the hovering rotor 31*b* detects a sudden change, the operation-related value detected by a sensor included in the EPU 10 corresponding to another rotor 30 with the same function as the hovering rotor 31*b*, such as the hovering rotor 31*c*, may be used to control the EPU 10. Similarly to the hovering rotor 31*b*, the hovering rotor 31*c* is placed in the front of the body to vertically support the load of the front of the body, contributing to the take-off of the electric aircraft 20. In this case, the sensor included in the EPU 10 corresponding to the hovering rotor 31*b* corresponds to a third sensor in the present disclosure. The EPU 10 may also be controlled using the operation-related value detected by a sensor included in any other EPU 10 that does not have the same function but is operating normally. In such a system, the sensor included in any other EPU 10 that is operating normally corresponds to a third sensor in the present disclosure.

(F4) Modified Embodiment 4

Although using (driving) of the EPU 10 is stopped in step S155 of the EPU control processing in the first and third to fifth embodiments and in step S215 of the EPU control processing in the second embodiment, the present disclosure is not limited to the embodiments. For example, while the EPU 10 continues to be used (driven), the EPU 10 may stop transmitting (supplying) power to the rotor 30. For example, with the shaft 17 detachably connected to the rotor 30 in the normal state, the shaft 17 and the rotor 30 may be disconnected from each other in steps S155 and S215. Such a system also provides the same effects as each embodiment.

(F5) Modified Embodiment 5

In each embodiment, the alternative control performed may be open control that uses no sensor detection values. In some examples, a torque command value may be determined based on an operation-related value detected by a sensor before a sudden change occurs, and the torque command value may be continuously used to control the EPU 10. In other examples, a default torque command value may be prepared in advance for alternative control, and the default value may be continuously used to control the EPU 10.

(F6) Modified Embodiment 6

The configurations of the EPU 10, the control device 110, the electric drive system 100, and the electric aircraft 20 in each embodiment are mere examples and may be variously modified. For example, the control unit 112 for the control device 110 may not be installed in the electric aircraft 20 but may be, for example, a server installed in a ground control center. Such a system may allow each EPU 10 to be controlled using communication through the communication device 60.

(F7) The control unit 112 and techniques described in the present disclosure may be implemented by a special purpose computer including memory and a processor programmed to execute one or more functions embodied by computer programs. Alternatively, the control unit 112 and techniques described in the present disclosure may be implemented by a special purpose computer including a processor having one or more dedicated hardware logic circuits. Alternatively, the control unit 112 and techniques described in the present disclosure may be implemented by one or more special purpose computers including a combination of memory and a processor programmed to execute one or more functions and a processor having one or more hardware logic circuits. The computer programs may be stored in a non-transitory, tangible computer readable storage medium as instructions executed by a computer.

The present disclosure is not limited to the above embodiments but may be implemented in a variety of ways without departing from the spirit and scope thereof. For example, the technical features in each embodiment corresponding to the technical features in the aspects described in the Summary section may be replaced or combined as appropriate so as to solve some or all of the above-described problems or achieve some or all of the above-described effects. Unless described herein as being necessary, the technical features may be deleted as appropriate.

What is claimed is:

1. A control device comprising:

a control unit configured to control an electric propulsion unit for powering a rotor included in an electric aircraft, wherein the electric propulsion unit includes a motor configured to rotate the rotor, an inverter configured to supply AC power to the motor, a control circuit configured to control the inverter, and a first sensor configured to detect an operation-related value related to an operation state of the electric propulsion unit including an operation of the motor, and the control unit is configured to:

detect whether a sudden change in the operation-related value detected by the first sensor is beyond a predetermined range within a predetermined time;

upon detecting the sudden change, detect further whether the sudden change ends, and stop using the operation-related value detected by the first sensor to control the electric propulsion unit:

until the sudden change ends, when detected that the sudden change ends before a predetermined period ends, or beyond the ending of the predetermined time period, when detected that the sudden change has not ended after the predetermined time period ends, wherein the control unit is further configured to determine that an abnormality has occurred in the first sensor when detected that the sudden change has not ended after the predetermined time period elapses.

2. The control device according to claim 1, further comprising:

a storage, wherein the control unit is configured to, when the sudden change is detected, record sudden change related information into the storage, the sudden change related information being related to the occurrence of the sudden change.

3. The control device according to claim 2, wherein the electric aircraft includes a plurality of the electric propulsion units, the control unit is configured to control the plurality of electric propulsion units, and the sudden change related information includes information for identifying the electric propulsion unit in which the sudden change is detected among the plurality of electric propulsion units.

4. The control device according to claim 2, wherein the sudden change related information includes at least one of (i) a time of the detecting of the sudden change and (ii) location information about the electric aircraft at the time of the detecting of the sudden change.

5. The control device according to claim 1, wherein the control unit is configured to:

when the sudden change is detected in a steady state in which a target value of power supplied from the electric propulsion unit does not change beyond a predetermined range within a predetermined time, perform the stoppage, in the steady state, after the detecting of the sudden change, when the sudden change ends before a predetermined period elapses, resume using the operation-related value detected by the first sensor to control the electric propulsion unit, and in the steady state, after the detecting of the sudden change, when the sudden change has not ended after the predetermined period elapses, continue the stoppage.

6. The control device according to claim 1, wherein each of the electric propulsion units includes a second sensor being a sensor configured to detect the operation-related value and different from the first sensor, and the control unit is configured to, when the sudden change is detected, control the electric propulsion unit in which the sudden change is detected by using the operation-related value detected by the second sensor included in the electric propulsion unit in which the sudden change has occurred.

7. The control device according to claim 1, wherein the electric aircraft includes a plurality of the electric propulsion units, and the control unit is configured to, when the sudden change is detected, control the electric propulsion unit in which the sudden change is detected by using the operation-related value detected by a third sensor configured to detect the operation-related value and included in another electric propulsion unit than the electric propulsion unit in which the sudden change is detected.

8. The control device according to claim 1, wherein the control unit is configured to, when the sudden change is detected, stop power supply to the rotor from the electric propulsion unit in which the sudden change is detected.

9. The control device according to claim 1, wherein the electric aircraft includes:

as the rotor, a hovering rotor and a cruising rotor, and as the electric propulsion unit, a hovering propulsion unit being an electric propulsion unit for powering the hovering rotor and a cruising propulsion unit being an electric propulsion unit for powering the cruising rotor, the hovering propulsion unit includes a second sensor being a sensor configured to detect the operation-related value and different from the first sensor, and the control unit is configured to:

when the sudden change is detected and the electric propulsion unit in which the sudden change is detected is the hovering propulsion unit, control the hovering propulsion unit in which the sudden change is detected by using the operation-related value detected by the second sensor, and when the sudden change is detected and the electric propulsion unit in which the sudden change is detected is the cruising propulsion unit, stop power supply from the cruising propulsion unit to the cruising rotor in which the sudden change is detected.

10. The control device according to claim 1, wherein the electric aircraft includes, as the rotor, a plurality of hovering rotors and a cruising rotor, and as the electric propulsion unit, a plurality of hovering propulsion units being electric propulsion units for powering the plurality of hovering rotors and a cruising propulsion unit being an electric propulsion unit for powering the cruising rotor, and the control unit is configured to:

when the sudden change is detected and the electric propulsion unit in which the sudden change is detected is the hovering propulsion unit, control the hovering propulsion unit in which the sudden change is detected by using the operation-related value detected by a third sensor being a sensor included in another hovering propulsion unit than the hovering propulsion unit in which the sudden change is detected, and when the sudden change is detected and the electric propulsion unit in which the sudden change is detected is the cruising propulsion unit, stop power supply from the cruising propulsion unit in which the sudden change is detected to the cruising rotor.

11. The control device according to claim 1, wherein the electric aircraft includes:

as the rotor, a first rotor and a second rotor nearer to a body gravity center of the electric aircraft than the first rotor, and as the electric propulsion unit, a first propulsion unit being an electric propulsion unit for powering the first rotor and a second propulsion unit being an electric propulsion unit for powering the second rotor, the first propulsion unit includes a second sensor being a sensor configured to detect the operation-related value and different from the first sensor, and the control unit is configured to:

when the sudden change is detected and the electric propulsion unit in which the sudden change is detected is the first propulsion unit, control the first propulsion unit in which the sudden change is detected by using the operation-related value detected by the second sensor, and when the sudden change is detected and the electric propulsion unit in which the sudden change is detected is the second propulsion unit, stop power supply from the second propulsion unit in which the sudden change is detected to the second rotor.

12. The control device according to claim 1, wherein the electric aircraft includes:

as the rotor, a plurality of first rotors and a second rotor nearer to a body gravity center of the electric aircraft than the plurality of first rotors, and as the electric propulsion unit, a plurality of first propulsion units being electric propulsion units for powering the plurality of first rotors and a second propulsion unit being an electric propulsion unit for powering the second rotor, and the control unit is configured to:

when the sudden change is detected and the electric propulsion unit in which the sudden change is detected is a first propulsion unit, control the first propulsion unit in which the sudden change is detected by using the operation-related value detected by a third sensor being a sensor included in another first propulsion unit than the first propulsion unit in which the sudden change is detected, and when the sudden change is detected and the electric propulsion unit in which the sudden change is detected is the second propulsion unit, stop power supply from the second propulsion unit in which the sudden change is detected to the second rotor.

13. A control device comprising:

a control unit configured to control an electric propulsion unit for powering a rotor included in an electric aircraft, wherein the electric propulsion unit includes a motor configured to rotate the rotor, an inverter configured to supply AC power to the motor, a control circuit configured to control the inverter, and a first sensor configured to detect an operation-related value related to an operation state of the electric propulsion unit including an operation of the motor, wherein the control unit is configured to:

detect whether a sudden change in the operation-related value detected by the first sensor is beyond a predetermined range within a predetermined time;

upon detecting the sudden change, detect further whether the sudden change ends, and stop power supply that depends on a first target value to the rotor from an anomalous unit being the electric propulsion unit in which the sudden change is detected, attempt to drive the anomalous unit with a second target value smaller than the first target value and further determine whether the anomalous unit is normal based on the operation-related value detected by the first sensor, when the anomalous unit is determined to be normal, resume using the operation-related value detected by the first sensor to control the electric propulsion unit, and when the anomalous unit is determined to be not normal, continue the stoppage.

14. A non-transitory computer-readable storage medium storing a computer program, the computer program controlling an electric propulsion unit configured to power a rotor included in an electric aircraft, wherein the electric propulsion unit includes a motor configured to rotate the rotor, an inverter configured to supply AC power to the motor, a control circuit configured to control the inverter, and a first sensor configured to detect an operation-related value related to an operation state of the electric propulsion unit including an operation of the motor, and the computer program causes a computer to implement:

detecting whether a sudden change in the operation-related value detected by the first sensor is beyond a predetermined range within a predetermined time;

upon detecting the sudden change, detecting further whether the sudden change ends, and stopping using the operation-related value detected by the first sensor to control the electric propulsion unit;

until the sudden change ends, when detected that the sudden change ends before a predetermined period ends; or beyond the ending of the predetermined time period, when detected that the sudden change has not ended after the predetermined time period ends; and determining that an abnormality has occurred in the first sensor when detected that the sudden change has not ended after the predetermined time period elapses.

15. A non-transitory computer-readable storage medium storing a computer program, the computer program controlling an electric propulsion unit configured to power a rotor included in an electric aircraft, wherein the electric propulsion unit includes a motor configured to rotate the rotor, an inverter configured to supply AC power to the motor, a control circuit configured to control the inverter, and a first sensor configured to detect an operation-related value related to an operation state of the electric propulsion unit including an operation of the motor, and the computer program causes a computer to implement:

detecting whether a sudden change in the operation-related value detected by the first sensor is beyond a predetermined range within a predetermined time;

upon detecting the sudden change, detecting further whether the sudden change ends, and a function of stopping power supply that depends on a first target value to the rotor from an anomalous unit being the electric propulsion unit in which the sudden change is detected, attempting to drive the anomalous unit with a second target value smaller than the first target value and further determine whether the anomalous unit is normal based on the operation-related value detected by the first sensor, when the anomalous unit is determined to be normal, resuming using the operation-related value detected by the first sensor to control the electric propulsion unit; and when the anomalous unit is determined to be not normal, continuing the stoppage.

* * * * *